United States Patent
Tan et al.

(10) Patent No.: US 7,324,715 B2
(45) Date of Patent: Jan. 29, 2008

(54) OPTICAL INFORMATION PROCESSING CIRCUIT ASSEMBLY

(75) Inventors: Tecktiong Tan, Singapore (SG); Binghua Pan, Singapore (SG); Jeffrey H. Burns, Kokomo, IN (US); Arun K. Chaudhuri, Carmel, IN (US); John R. Troxell, Sterling Heights, MI (US); Su Liang Chan, Singapore (SG)

(73) Assignee: Delphi Technologies, Inc., Troy, MI (US)

( * ) Notice: Subject to any disclaimer, the term of this patent is extended or adjusted under 35 U.S.C. 154(b) by 778 days.

(21) Appl. No.: 10/317,750

(22) Filed: Dec. 12, 2002

(65) Prior Publication Data

US 2004/0114851 A1  Jun. 17, 2004

(51) Int. Cl.
*G02B 6/12* (2006.01)
(52) U.S. Cl. .................... 385/14; 385/132; 385/49; 385/88
(58) Field of Classification Search .................. 385/14, 385/33, 88–94
See application file for complete search history.

(56) References Cited

U.S. PATENT DOCUMENTS

| | | | |
|---|---|---|---|
| 4,899,099 A * | 2/1990 | Mendenhall et al. | 324/754 |
| 5,347,377 A * | 9/1994 | Revelli et al. | 349/193 |
| 6,396,116 B1 * | 5/2002 | Kelly et al. | 257/432 |
| 6,415,394 B1 | 7/2002 | Fruehling et al. | |
| 6,421,790 B1 | 7/2002 | Fruehling et al. | |
| 6,525,944 B1 * | 2/2003 | Li | 361/760 |
| 6,542,672 B2 * | 4/2003 | Jewell et al. | 385/49 |
| 6,550,982 B2 * | 4/2003 | Auburger et al. | 385/88 |
| 6,625,688 B1 | 9/2003 | Fruehling et al. | |
| 6,698,085 B2 * | 3/2004 | Stevenson et al. | 29/622 |
| 6,724,015 B2 * | 4/2004 | Nelson et al. | 257/99 |
| 6,727,431 B2 * | 4/2004 | Hashimoto | 174/52.2 |
| 2001/0036000 A1 * | 11/2001 | Nishikawa et al. | 359/212 |

* cited by examiner

*Primary Examiner*—Frank G. Font
*Assistant Examiner*—Eric Wong
(74) *Attorney, Agent, or Firm*—Jimmy L. Funke

(57) ABSTRACT

An optical information processing circuit assembly includes an optically transmissive substrate and a resiliently compressible circuit member affixed to the substrate and defining an opening therethrough with a number of leads disposed about the opening. An integrated imaging circuit defines a corresponding number of pads wherein the pads align with and electrically contact the leads. An optically transmissive medium may be disposed between and in contact with the substrate and the integrated imaging circuit to allow light transmission therethrough from the substrate to the imaging circuit. In one embodiment, resilient bumps are provided between the integrated imaging circuit and the resiliently compressible circuit member to form the electrical connection therebetween. Alternatively, solder bumps may replace the resilient bumps. Additional circuit components may be similarly mounted to the resiliently compressible circuit member to complete the assembly.

23 Claims, 3 Drawing Sheets

OPTICAL INFORMATION PROCESSING CIRCUIT ASSEMBLY

TECHNICAL FIELD

The present invention relates generally to techniques for mounting integrated circuits to a substrate using flip chip technology, and more specifically to such techniques wherein one or more of the integrated circuits require light transmission through the substrate.

BACKGROUND OF THE INVENTION

Integrated imaging circuits are known and typically include light sensitive circuitry responsive to the light intensity and wavelength of a scene to form an electronic image of the scene. The electronic images are typically provided by such circuits in the form of digital signals each representing individual pixels of the overall image.

Integrated imaging circuits of the foregoing type have been implemented in camera and video recording equipment, wherein such circuits generally form part of a larger optical information processing circuit assembly. Such assemblies not only require reliable packaging and electrical interconnect arrangements, but also require an interface to one or more optical lenses. Consequently, such requirements present unique device mounting and packaging challenges.

One known technique for mounting integrated circuits to suitable substrates involves a so-called flip chip technique, wherein bumps of solder or other conductive material are attached to the integrated circuit I/O bond pads. The integrated circuit is then mounted to a substrate with the circuit facing the substrate and with the conductive bumps in contact with corresponding bonding locations formed on the substrate. The conductive bumps are thereafter attached to the bonding locations using conventional solder reflow, thermo-compression or adhesive bonding techniques.

Flip chip technology is generally understood to provide for better interconnect integrity and reliability than many other integrated circuit interconnect techniques, and to also provide for very compact electronic assemblies, particularly when combined with conventional surface mounting techniques for discrete electronic components. It is accordingly desirable to develop useful and reliable flip chip mounting techniques for integrated imaging circuits generally, and to use such techniques to construct compact optical information processing circuit assemblies.

SUMMARY OF THE INVENTION

The present invention comprises one or more of the following features or combinations thereof. An optical integrated circuit is mounted to a resiliently compressible circuit member affixed to an optically transmissive substrate. The resiliently compressible circuit member defines an opening therethrough with a number of electrically conductive leads disposed about the opening, and the integrated circuit has a surface defining a number of electrically conductive pads disposed about an imaging circuit. Each of the number of electrically conductive pads electrically contact corresponding ones of the number of electrically conductive leads with the surface of the integrated circuit facing the substrate through the opening defined through the resiliently compressible circuit. An optically transmissive medium may be disposed between and in contact with the substrate and the surface of the integrated circuit, wherein the medium allows light transmission therethrough from the substrate to the imaging circuit.

The substrate defines a first refractive index and the surface of the integrated circuit defines a second refractive index, and the optically transmissive medium may be configured to match the first refractive index to the second refractive index. The optically transmissive medium may be a formable medium that, when set, bonds the surface of the integrated circuit to the resiliently compressible circuit member and to the substrate.

A resilient bump may be disposed between each of the number of electrically conductive pads and corresponding ones of the number of electrically conductive leads, and the optically transmissive medium may be set while the resilient bumps are under compression so that each of the resilient bumps maintains electrical contact between a corresponding electrically conductive pad and electrically conductive lead when the compression is thereafter removed. The optically transmissive medium may be an electrically non-conductive paste.

A solder bump may alternatively be disposed between each of the number of electrically conductive pads and corresponding ones of the number of electrically conductive leads, and the optically transmissive medium may be set while the solder bumps are reflowed to electrically and mechanically connect each of the number of electrically conductive pads to corresponding ones of the electrically conductive leads. Alternatively, the optically transmissive medium may be provided between the substrate and the integrated imaging circuit after the solder bumps are reflowed using known capillary underfill or other suitable technique. Alternatively still, the optically transmissive medium may be omitted in this embodiment.

The mounted integrated imaging circuit may form part of an optical image processing circuit assembly carried by the substrate. For example, the resiliently compressible circuit member may be flexible and comprise a first portion affixed to a top surface of the substrate and defining the opening therethrough, and a second portion affixed to a bottom surface of the substrate. One of the first or second portions of the resiliently compressible circuit member may extend away from the substrate and define thereon an electrical connection structure. The second portion of the resiliently compressible circuit member may define a second opening therethrough to the bottom surface of the substrate that is aligned with the opening defined through the first portion of the flexible circuit member, and a lens housing may be mounted to the bottom surface of the substrate through the second opening defined by the resiliently compressible circuit member. The lens housing may carry at least one optical lens configured to focus light through the substrate to the imaging circuit. A number of additional circuit components may be mounted to the resiliently compressible circuit member on either side of the substrate, wherein any such additional circuit components and the electrical connection structure are all electrically interconnected to form the optical image processing circuit.

As another example wherein the mounted integrated imaging circuit may form part of an optical image processing circuit assembly, the substrate may be partitioned into a number of circuit-carrying substrates joined by a flexible embodiment of the resiliently compressible circuit member affixed to each. In this example, a first substrate defines a top surface and an opposite bottom surface, and the first portion of the resiliently compressible circuit member defining the opening therethrough is affixed to the top surface of the first substrate. A lens housing may be mounted to the bottom surface of the first substrate and aligned with the opening, and the lens housing may carry at least one optical lens configured to focus light through the first substrate to the imaging circuit. A second substrate may have a second portion of the resiliently compressible circuit member affixed thereto, and the second portion of the resiliently compressible circuit member may include a first number of additional circuit components mounted thereto. A third substrate may have a third portion of the resiliently compressible circuit member affixed thereto, and the third portion of the resiliently compressible circuit may have a second number of additional circuit components mounted thereto. One of the second and third portions of the resiliently compressible circuit member may extend away from a corresponding one of the second and third substrates, and define thereon an electrical connection structure. The imaging circuit, the first and second number of additional circuit components and electrical connection structure may all be electrically interconnected to form the optical image processing circuit. The first, second and third substrates may be affixed to a camera housing.

A method of assembling an optical information processing circuit may comprise the steps of providing an optically transmissive substrate, affixing a resiliently compressible circuit member to one side of the substrate, the resiliently compressible circuit member defining an opening therethrough with a number of electrically conductive leads disposed about the opening, dispensing a formable optically transmissive medium onto the substrate through the opening and onto the resiliently compressible circuit member adjacent to the opening, aligning a number of electrically conductive pads defined on one surface of an integrated imaging circuit with corresponding ones of the number of electrically conductive leads, each of the number of electrically conductive pads having a resilient bump affixed thereto, embedding the integrated imaging circuit into the formable optically transmissive medium and applying heat and compression to the integrated imaging circuit to compress the resilient bumps onto the electrically conductive leads, and curing the formable optically transmissive medium while the integrated imaging circuit is under compression until the formable optically transmissive medium bonds to the substrate, the resiliently compressible circuit and the integrated imaging circuit.

Another method of assembling an optical information processing circuit may comprise the steps of providing an optically transmissive substrate, affixing a resiliently compressible circuit member to one side of the substrate, the resiliently compressible circuit member defining an opening therethrough with a number of electrically conductive leads disposed about the opening, dispensing a formable optically transmissive medium onto the substrate through the opening and onto the resiliently compressible circuit member adjacent to the opening, aligning a number of electrically conductive pads defined on one surface of an integrated imaging circuit with corresponding ones of the number of electrically conductive leads, each of the number of electrically conductive pads having a solder bump affixed thereto, embedding the integrated imaging circuit into the formable optically transmissive medium and with the solder bumps in contact with corresponding ones of the number of electrically conductive leads, and heating the substrate, resiliently compressible circuit member and integrated imaging circuit to simultaneously reflow the solder bumps and cure the formable optically transmissive medium.

Yet another method of assembling an optical information processing circuit may comprise the steps of providing an optically transmissive substrate, affixing a resiliently compressible circuit member to one side of the substrate, the resiliently compressible circuit member defining an opening therethrough with a number of electrically conductive leads disposed about the opening, aligning a number of electrically conductive pads defined on one surface of an integrated imaging circuit with corresponding ones of the number of electrically conductive leads, each of the number of electrically conductive pads having a solder bump affixed thereto, bringing the solder bumps in contact with corresponding ones of the number of electrically conductive leads, and reflowing the solder bumps to mechanically and electrically attach the number of electrically conductive pads to corresponding ones of the number of electrically conductive lead. The method in this embodiment may further include the steps of dispensing a formable optically transmissive medium between and in contact with the substrate and the integrated imaging circuit, and curing the formable optically transmissive medium.

These and other features of the present invention will become more apparent from the following description of the illustrative embodiments.

DESCRIPTION OF THE ILLUSTRATIVE EMBODIMENTS

Figure 1:
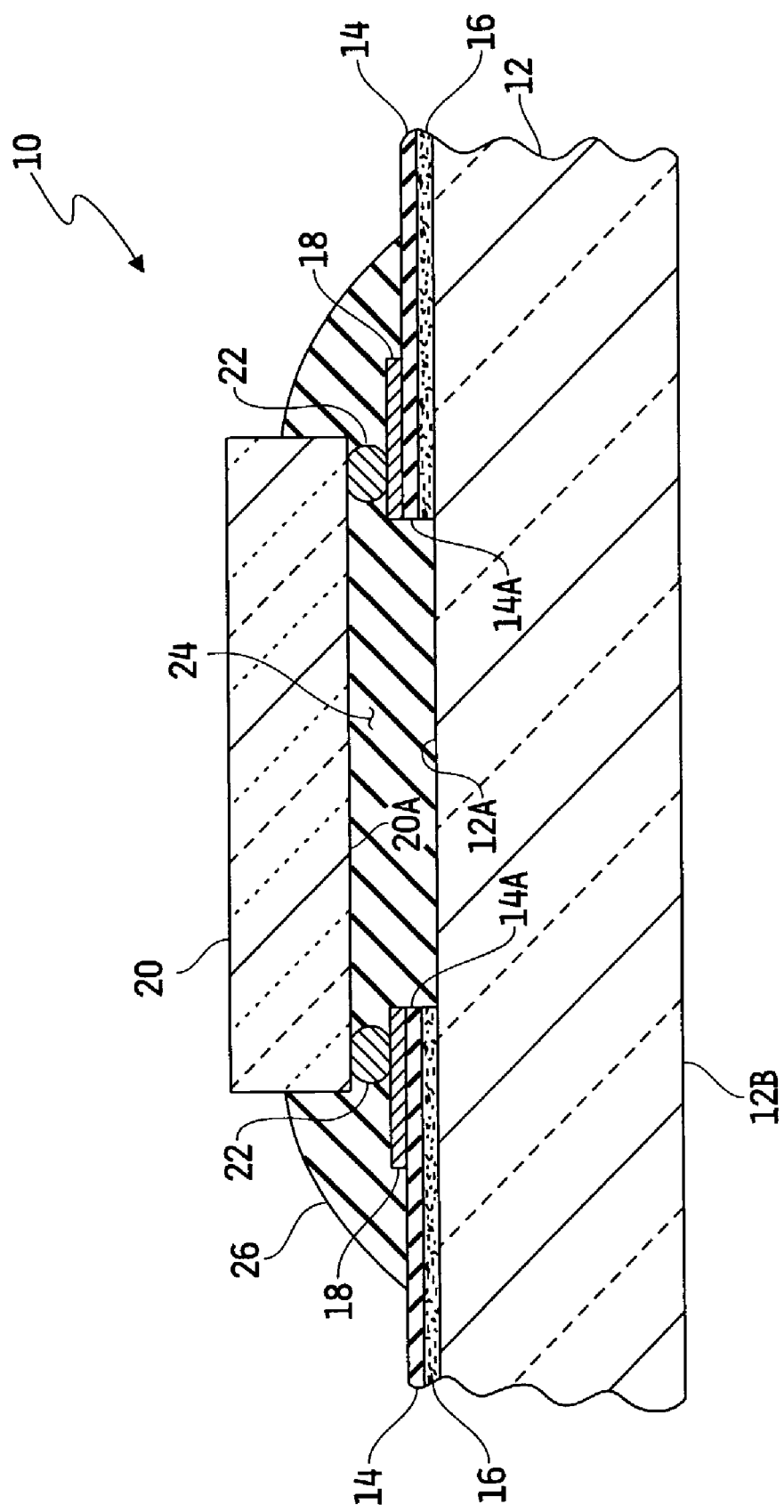
FIG. 1 is a cross-sectional view of a portion of an optical information processing circuit assembly including an integrated imaging circuit mounted to a flexible circuit and to a light transmissive substrate.

Referring now to FIG. 1, a cross-sectional view of a portion of an optical information processing circuit assembly 10 is shown including an integrated imaging circuit 20 mounted to a resiliently compressible circuit 14 and to a optically transmissive substrate 12. In one embodiment, the optically transmissive substrate 12 is formed of transparent, optical-quality glass, such as item no. 1737F available from Corning Corporation. It will be understood, however, that substrate 12 may alternatively be formed of, or include, other optically transmissive materials. Examples of such other optically transmissive materials include, but are not limited to, optical-quality plastics, fused silica, or the like. The substrate 12 may further include an anti-reflective coating on one or both surfaces thereof to minimize light transmission losses resulting from light reflections, and may further still be configured with light focusing properties to function as a lens.

The resiliently compressible circuit 14 includes a conventional electrically conductive film 18 printed or otherwise patterned thereon to form circuit connections as is known in the printed circuit art. In one embodiment, the resiliently compressible circuit 14 is a film formed of polyimide, which is commercially available from a number of suppliers, such as Nitto Denko Corporation of Osaka, Japan. Alternatively, circuit 14 may be formed of, or include, other resiliently compressible film materials such as, for example, polyethylene naphthalate (PEN), liquid crystalline polymer (LCP), polyeherimideultem, or the like. In any case, the resiliently compressible circuit 14 is at least somewhat compressible with sufficient force applied thereto, and is also resilient in that it tends to at least partially return to its pre-compressed state when the compression force is removed therefrom. In some embodiments, it is further desirable for the resiliently compressible circuit 14 to be flexible so that it may be formed in one or more orientations to one or more substrates as will be described in greater detail hereinafter. In any case, the resiliently compressible circuit 14 is affixed to the top surface 12A of the substrate 12 via an adhesive layer 16 or other suitable bonding medium. In one embodiment, adhesive layer 16 is a temperature sensitive adhesive, commercially available from Nitto Denko Corporation as item no. NA-51, although it will be understood that other adhesives and/or suitable bonding mediums may be used.

The resiliently compressible circuit 14 defines an opening 14A therethrough, and the conductive film 18 is patterned onto the circuit 14 about the opening 14A to form a number of electrically conductive leads. The electrically conductive leads formed by the conductive film 18 about the opening 14A are arranged complementarily to a corresponding number of electrically conductive bond pads defined on the imaging circuit surface 20A of the integrated imaging circuit 20. The electrically conductive bond pads are generally defined about the imaging circuitry of the integrated imaging circuit 20, and have electrically conductive bumps 22 bonded thereto. An optically transmissive formable medium 26 may be dispensed onto the top surface 12A of the substrate 12 and also on the resiliently compressible circuit 14 about the opening 14, and the integrated imaging circuit 20 may then be mounted to the resiliently compressible circuit 14 with the electrically conductive bumps 22 aligned with the electrically conductive leads 18 such that electrical contact is made therebetween. In the illustrated embodiment, the integrated imaging circuit 20 is thus mounted to the resiliently compressible circuit 14 as a so-called flip chip with the imaging circuit surface 20A facing the substrate 12. A space 24 is thereby defined between the imaging circuit surface 20A of the integrated imaging circuit 20 and the top surface 12A of the substrate 12, which is occupied in one embodiment by the optically transmissive medium 26. The optically transmissive medium 26 is configured to permit transmission of light therethrough from the substrate 12 to the integrated imaging circuit 20. One goal of the use of medium 26 is to fill the space 24 in order to prevent the influx of contaminants, including moisture, that may occur if the assembly 10 is not sealed within a hermetic package. Another goal of the use of medium 26 may be to reduce reflection losses at the inner window surface 12A and at the surface 20A of the imaging circuit 20 by matching the index of refraction of one or both of these components, and in one embodiment medium 26 is thus configured to match the refractive index of the imaging circuit surface 20A of the integrated imaging circuit 20 to the refractive index of the substrate 12. In any case, images in the form of varying light wavelength and intensity traveling through the bottom side 12B of the substrate are directed through the optically transmissive medium 26 to the imaging circuit surface 20A of the integrated imaging circuit 20. Electrical signals generated by the integrated imaging circuit 20 resulting from detection of such images are then supplied to imaging processing circuitry on board the optical information processing circuit assembly 10 (see, for example, FIGS. 4 and 5) for further processing.

Figures 2, 3:
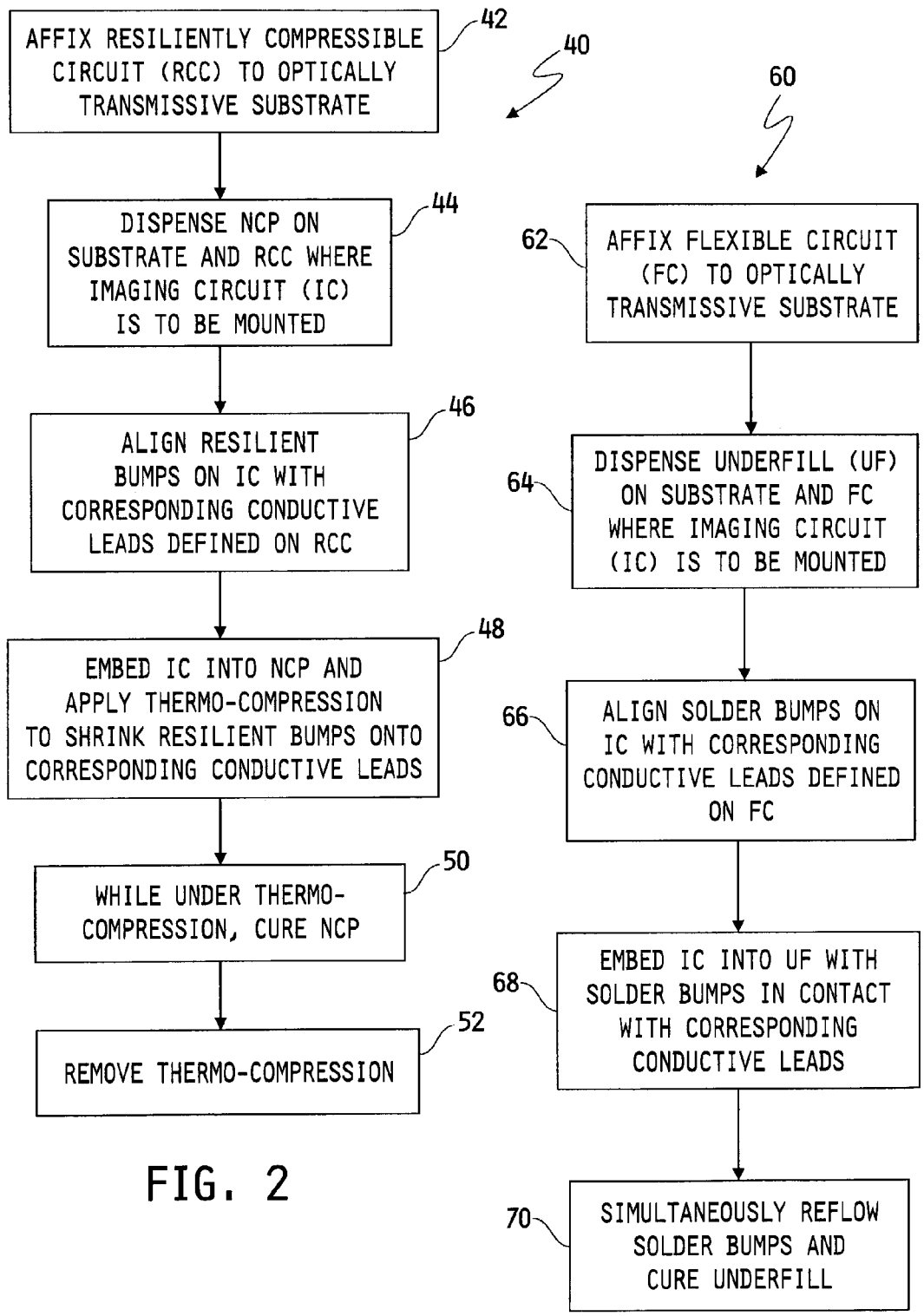
FIG. 2 is a flowchart of one illustrative process for constructing the optical information processing circuit assembly of FIG. 1.
FIG. 3 is a flowchart of another illustrative process for constructing the optical information processing circuit assembly of FIG. 1.

Referring now to FIG. 2, a flowchart is shown illustrating one process 40 for constructing the integrated circuit assembly of FIG. 1. In this process, the electrically conductive bumps 22 are resilient gold (Au) bumps of known construction that may be electrically and mechanically attached to the conductive leads 18 via a known thermo-compression bonding process. Process 40 begins at step 42 where the resiliently compressible circuit 14 is attached to the optically transmissive substrate 12 as described hereinabove with respect to FIG. 1. Thereafter at step 44, the optically transmissive formable medium 26, initially in uncured or unset form, is dispensed onto the surface 12A of the substrate 12 exposed by the opening 14A of the resiliently compressible circuit 14, and also onto the resiliently compressible circuit 14 about the opening 14A to cover at least the portions of the conductive leads 18 that will be subsequently bonded to the conductive bumps 22. In this embodiment, the optically transmissive medium 26 is configured to bond, upon curing and setting thereof, to the imaging circuit surface 20A of the integrated imaging circuit 20, the top surface 12A of the substrate 12 and to the resiliently compressible circuit 14 to thereby keep contaminates out of space 24 while also providing for transmission of light therethrough from the substrate 12 to the integrated imaging circuit 20. Additionally, medium 26 is configured to form such a bond with sufficient strength to maintain the resilient bumps 22 in mechanical (and thereby electrical) contact with the conductive leads defined by the conductive film 18 to thereby maintain electrical connection between the integrated imaging circuit 20 and image processing circuitry located elsewhere on the optical image processing circuit assembly 10. In one embodiment of process 40, the optically transmissive medium 26 is a non-conductive paste (NCP) commercially available from Dexter Corporation of Windsor Locks, CT as item no. CNB753-39, although it will be understood that other formulations of medium 26 may be used that satisfy the structural and functional properties described herein.

Following step 44, process 40 advances to step 46 where the integrated imaging circuit 20 is oriented such that the number of resilient bumps 22 align with the corresponding number of conductive leads defined by the conductive film 18. Thereafter at step 48, the integrated imaging circuit 20 is embedded into the optically transmissive medium 26 and advanced toward the resiliently compressible circuit 14 so that the number of resilient bumps 22 come into contact with the corresponding number of conductive leads defined by the conductive film 18, and heat and compression is then applied to the integrated imaging circuit 20, according to a known thermo-compression process, to simultaneously compress the compressible resilient circuit 14 and compress the resilient bumps 22 onto the corresponding conductive leads defined by the conductive film 18 in a known manner. While under thermo-compression, the optically transmissive medium is heat cured until set as indicated at step 50. Thereafter at step 52, thermo-compression is removed from the integrated imaging circuit 20. In this embodiment, electrical conductivity between the integrated imaging circuit 20 and the resiliently compressible circuit 14 is maintained through the mechanical contact between the resilient bumps 22 and the conductive leads formed by the conductive film 18 resulting from the bonding and setting of the optically transmissive medium 26 to the integrated imaging circuit 20, the substrate 12 an the resiliently compressible circuit 14. The cured medium 26 maintains the compressive force on the interface between the resilient bumps 22 and the electrically conductive leads formed by the conductive film 18. While the compressive force of the cured medium may relax somewhat after removal of the thermo-compression fixture, the resilient nature of the bumps 22 aid in maintaining mechanical and electrical contact between the bumps 22 and the electrical leads formed by the conductive film 18. Additionally, the resilient nature of the resiliently compressible circuit 14 allows circuit 14 to move from its compressed state under thermo-compressive force back toward its pre-compressed state to thereby "follow" the bumps 22 resulting from any relaxation of the cured medium 26. This resilient nature of the resiliently compressible circuit 14 further aids in maintaining mechanical and electrical contact between the bumps 22 and the electrical leads formed by the conductive film 18.

Referring now to FIG. 3, a flowchart is shown illustrating another process 60 for constructing the integrated circuit assembly of FIG. 1. In this process, the electrically conductive bumps 22 are conventional solder bumps that may be electrically and mechanically attached to the conductive leads 18 via a known solder reflow process. Process 60 is identical in some respects to process 40 illustrated in FIG. 2, and like process 40 process 60 begins at step 62 where the flexible circuit 14 is attached to the optically transmissive substrate 12 as described hereinabove with respect to FIG. 1. It is to be noted that in this embodiment, the circuit 14 need not strictly be resiliently compressible as described hereinabove, although flexible materials of the type described hereinabove for forming circuit 14 tend to be at least somewhat resiliently compressible. For the purpose of describing process 60, circuit 14 will thus be described as a "flexible circuit". Following step 62, the optically transmissive formable medium 26, initially in uncured or unset form, is dispensed at step 64 onto the surface 12A of the substrate 12 exposed by the opening 14A of the flexible circuit 14, and also onto the flexible circuit 14 about the opening 14A to cover at least the portions of the conductive leads 18 that will be subsequently bonded to the conductive bumps 22. In this embodiment, the optically transmissive medium 26 is configured to bond, upon curing and setting thereof, to the imaging circuit surface 20A of the integrated imaging circuit 20, the top surface 12A of the substrate 12 and to the flexible circuit 14, to thereby keep contaminates out of space 24 while also providing for transmission of light therethrough from the substrate 12 to the integrated imaging circuit 20. In one embodiment of process 60, the optically transmissive medium 26 is a no-flow underfill (UF) material commercially available from Advanpack Solutions Ptd. Ltd. of Singapore as "P-Bond", although it will be understood that other formulations of medium 26 may be used that satisfy the structural and functional properties described herein.

Following step 64, process 60 advances to step 66 where the integrated imaging circuit 20 is oriented such that the number of solder bumps 22 align with the corresponding number of conductive leads defined by the conductive film 18. Thereafter at step 68, the integrated imaging circuit 20 is embedded into the optically transmissive medium 26 and advanced toward the flexible circuit 14 so that the number of solder bumps 22 come into contact the corresponding number of conductive leads defined by the conductive film 18. Thereafter at step 70, the solder bumps 20 are reflowed, via appropriate heat application, while simultaneously curing the optically transmissive medium 26 until set. In this embodiment, electrical conductivity between the integrated imaging circuit 20 and the flexible circuit 14 is maintained through the metallurgical bonds formed between the solder bumps 22 and the conductive leads formed by the conductive film 14.

In an alternate embodiment of process 60, medium 26 is provided between the substrate 12 and the integrated imaging circuit 20 after the solder bumps 22 are reflowed according to a known capillary underfill or other suitable process. In this embodiment, process 60 may thus be modified to omit step 64. Step 68 is replaced with the step of bringing the solder bumps 22 attached to the integrated imaging circuit 20 into contact with the corresponding conductive leads formed by the conductive film 18, and step 70 is replaced with the step of reflowing the solder bumps 22 to electrically and mechanically attach the integrated imaging circuit 20 to the conductive leads formed on the flexible circuit 14 by the conductive film. Thereafter, process 60 includes the additional steps of dispensing the formable optically transmissive medium 26 between and in contact with the substrate 12 and the integrated imaging circuit 20, and curing the medium 26. In another alternate embodiment of process 60, medium 26 is omitted and the modifications to process 60 just described may be further modified to omit the final two steps.

Figure 4:
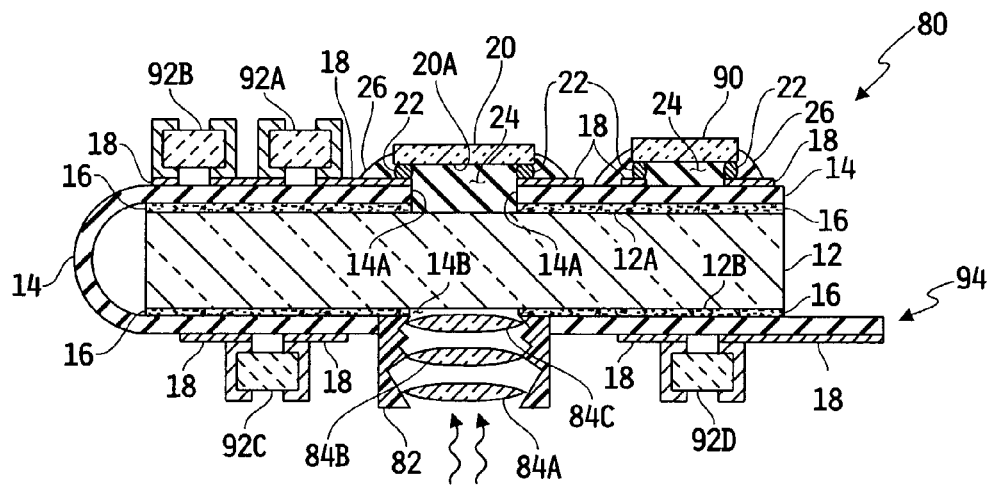
FIG. 4 is a cross-sectional view illustrating one embodiment of an optical information processing circuit including an integrated imaging circuit as illustrated in FIG. 1.

The structures and techniques described thus far may be extended to the formation of compact and reliable optical information processing circuit assemblies for use in, for example, digital cameras, digital video equipment and other image capture/processing applications. One example of such an optical information processing circuit assembly 80 is illustrated in FIG. 4, wherein assembly 80 includes a number of structures and components identical to those illustrated and described with respect to FIG. 1. Like numbers are accordingly used in FIG. 4 to identify like structures and components. Assembly 80 includes an integrated imaging circuit 20 mounted to a flexible circuit 14 and optically transmissive substrate 12 as described hereinabove with respect to FIG. 1 and using either of the techniques described with respect to FIGS. 2 and 3. In this embodiment, the flexible circuit 14 is wrapped around the substrate 12 and affixed to the bottom surface 12B thereof in the same manner as described with respect to FIG. 1. One end of the flexible substrate 14; e.g., the end extending from the bottom surface 12B of the substrate 12 in FIG. 4, forms an electrical connection structure 94 carrying a number of connector leads formed by the conductive layer 18. The electrical connection structure 94 is configured for mating connection to an electrical connector (not shown) interfacing with circuitry and/or electrical components external to assembly 80.

The flexible circuit 14 defines another opening 14B to the bottom surface 12B of the substrate 12, and a lens housing 82 is affixed to the bottom surface 12B of substrate 12 via adhesive layer 16 or a mechanical fastener. Lens housing 82 carries a number of optical lenses and/or compound lenses, and in FIG. 4 housing 82 is illustrated as carrying three such lenses 84A, 84B and 84C. However, those skilled in the art will recognize that housing 82 may be configured to carry more or fewer lenses or compound lenses than the three illustrated in FIG. 4. In any case, the opening 14B is aligned with the opening 14A so that the optical lenses 84A-84C are suitably positioned to focus light through the substrate 12 to the integrated imaging circuit 20 as illustrated in FIG. 4 by the pair of arrow-tipped wavy lines below the lens housing 82.

Assembly 80 may include any number of additional integrated circuits and/or discrete components mounted to the flexible circuit 14, wherein the number and function of any such additional integrated circuits and/or components will typically be dictated by the application. In the assembly 80 illustrated in FIG. 4, for example, a digital signal processing integrated circuit 90 is mounted to the flexible circuit 14 adjacent to the integrated imaging circuit 20. With the exception of forming an opening through the flexible circuit 14 to the substrate 12, the digital signal processing integrated circuit 90 may be mounted to the flexible circuit 14 using either of the processes described hereinabove with respect to FIGS. 2 and 3. Those skilled in the art will recognize that other integrated circuits may be additionally or alternatively mounted to the flexible circuit 14. Assembly 80 illustrated in FIG. 4 further includes a number of discrete components 92A-94D mounted to the flexible circuit 14 on either side of the substrate 12 via suitable means such as, for example, a conventional reflowable solder paste. Discrete components 92A-92D may represent any one or combination of conventional discrete electrical components including, but not limited to, chip resistors, chip capacitors, diodes or the like. The conductive film 18 formed on the flexible circuit 14 is patterned in a manner that electrically connects the integrated imaging circuit 20, digital signal processing circuit 90, discrete electrical components 92A-92D and the electrical connection structure 94 to form the optical image processing circuit assembly 80.

Figure 5:
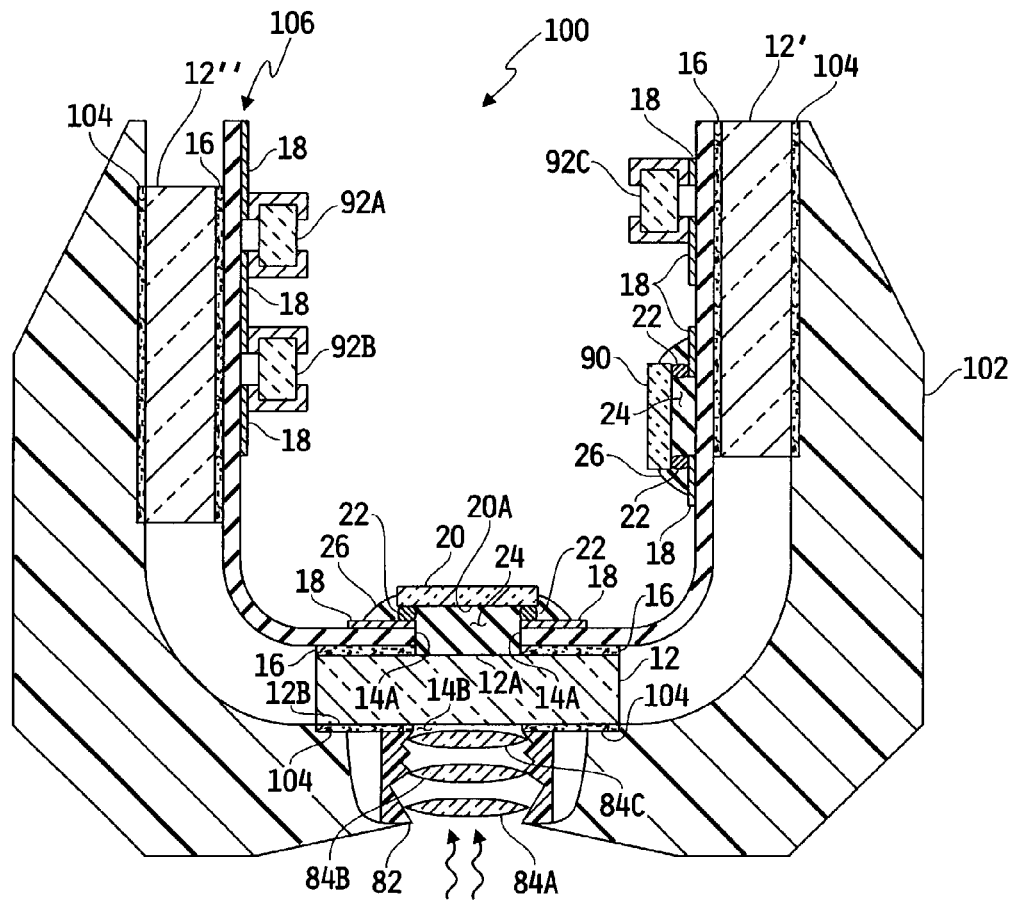
FIG. 5 is a cross-sectional view illustrating another embodiment of an optical information processing circuit including an integrated imaging circuit as illustrated in FIG. 1.

Another example of an optical information processing circuit assembly 100 is illustrated in FIG. 5, wherein assembly 100 includes a number of structures and components identical to those illustrated and described with respect to FIGS. 1 and 4. Like numbers are accordingly used in FIG. 5 to identify like structures and components. Assembly 100 includes an integrated imaging circuit 20 mounted to a flexible circuit 14 and to a first optically transmissive substrate 12 as described hereinabove with respect to FIG. 1 and using either of the techniques described with respect to FIGS. 2 and 3. A lens housing 82 is affixed to the bottom surface 12B of substrate 12 via a suitable adhesive layer 104 which may or may not be identical to adhesive layer 16. In any case, lens housing 82 carries a number of optical lenses, and in FIG. 5 housing 82 is again illustrated as carrying three such lenses 84A, 84B and 84C. However, those skilled in the art will recognize that housing 82 may be configured to carry more or fewer lenses than the three illustrated in FIG. 5. The lens housing 82 is positioned relative to the substrate 12 such that the optical lenses 84A-84C are suitably positioned to focus light through the substrate 12 to the integrated imaging circuit 20 as illustrated in FIG. 5 by the pair of arrow-tipped wavy lines below the lens housing 82.

In this embodiment, the flexible circuit 14 extends beyond substrate 12 and is further affixed to one surface of a second substrate 12' and to one surface of a third substrate 12", wherein each of the substrates 12, 12' and 12" are affixed to an assembly housing 102 via an appropriate adhesive 104 or other suitable bonding medium. The assembly housing 102 is configured in a U-shape so that substrates 12' and 12" are oriented substantially normal relative to substrate 12 to thereby provide for a compact assembly. Those skilled in the art will recognize that more or fewer substrates may be included in assembly 100, and that assembly 100 may therefore be shaped as desired to satisfy design goals. In any case, both of the substrates 12' and 12" illustrated in FIG. 5 may be formed of the same optically transmissive material used for substrate 12, although those skilled in the art will recognize that because neither of the substrates 12' and 12" carry an integrated imaging circuit 20 or associated lens housing 82, substrates 12' and/or 12" may alternatively be formed of a non-optically transmissive material. Examples of such non-optically transmissive materials forming either of substrates 12' or 12" include, but are not limited to, alumina or other ceramic material or other conventional rigid printed circuit board material. In any case, one end of the flexible substrate; e.g., the end extending from substrate 12" in FIG. 5, forms an electrical connection structure 106 carrying a number of connector leads formed by the conductive layer 18. The electrical connection structure 106 is configured for mating connection to an electrical connector (not shown) interfacing with circuitry and/or electrical components external to assembly 80.

Any number of additional integrated circuits and/or discrete components may be mounted to the flexible circuit 14 affixed to any of the substrates 12, 12' and/or 12", wherein the number and function of any such additional integrated circuits and/or components will typically be dictated by the application. In the assembly 100 illustrated in FIG. 5, for example, a digital signal processing integrated circuit 90 is mounted to the flexible circuit 14 affixed to the substrate 12'. With the exception of forming an opening through the flexible circuit 14 to the substrate 12', the digital signal processing integrated circuit 90 may be mounted to the flexible circuit 14 using either of the processes described hereinabove with respect to FIGS. 2 and 3. Those skilled in the art will recognize that other integrated circuits may be additionally or alternatively mounted to the flexible circuit 14 affixed to any one or more of the substrates 12, 12' and/or 12".

Assembly 100 illustrated in FIG. 5 further includes a single discrete component 92A mounted to the flexible circuit 14 affixed to substrate 12' and a pair of discrete components 92B and 92C mounted to the flexible circuit 12 affixed to substrate 12". The discrete components may be mounted to the flexible circuits via any suitable means such as, for example, a conventional reflowable solder paste. Discrete components 92A-92C may represent any one or combination of conventional discrete electrical components including, but not limited to, chip resistors, chip capacitors, diodes or the like. The conductive film 18 formed on the flexible circuit 14 is patterned in a manner that electrically connects the integrated imaging circuit 20, digital signal processing circuit 90, discrete electrical components 92A-92C and the electrical connection structure 106 to form the optical image processing circuit assembly 100.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

The invention claimed is:

1. An optical information processing circuit assembly, the assembly comprising:
   an optically transmissive first substrate;
   a resiliently compressible circuit member affixed to said first substrate and defining a first opening therethrough with a number of electrically conductive leads disposed about said first opening; and
   an integrated circuit having a surface defining a number of electrically conductive pads disposed about an imaging circuit, each of said number of electrically conductive pads electrically contacting corresponding ones of said number of electrically conductive leads with said surface of said integrated circuit facing said first substrate through said first opening defined through said resiliently compressible circuit member.

2. The circuit assembly of claim 1 further including an optically transmissive medium disposed between and in contact with said first substrate and said surface of said integrated circuit, said medium allowing light transmission therethrough from said first substrate to said imaging circuit.

3. The assembly of claim 2 wherein said first substrate defines a first refractive index and said surface of said integrated circuit defines a second refractive index;
and wherein said optically transmissive medium is configured to match said first refractive index to said second refractive index.

4. The assembly of claim 2 wherein said optically transmissive medium is a formable medium that, when set, bonds said surface of said integrated circuit to said resiliently compressible circuit member and to said first substrate.

5. The assembly of claim 4 further including a resilient bump disposed between each of said number of electrically conductive pads and said corresponding ones of said number of electrically conductive leads.

6. The assembly of claim 5 wherein said optically transmissive medium is set while said resilient bumps are under compression so that each of said resilient bumps maintains electrical contact between a corresponding electrically conductive pad and electrically conductive lead when said compression is thereafter removed.

7. The assembly of claim 6 wherein said optically transmissive medium is an electrically non-conductive paste.

8. The assembly of claim 3 further including a solder bump disposed between each of said number of electrically conductive pads and said corresponding ones of said number of electrically conductive leads.

9. The assembly of claim 1, wherein solder bumps electrically and mechanically connect each of said number of electrically conductive pads to said corresponding ones of said electrically conductive leads.

10. The assembly of claim 1, wherein solder bumps electrically and mechanically connect each of said number of electrically conductive pads to said corresponding ones of said electrically conductive leads, and wherein an optically transmissive medium is provided between said first substrate and said surface of said integrated circuit.

11. The assembly of claim 1 wherein said first substrate defines a top surface and an opposite bottom surface;
and wherein said resiliently compressible circuit member is flexible and a first portion of said resiliently compressible circuit member defining said first opening therethrough is affixed to said top surface of said first substrate, and a second portion of said resiliently compressible circuit member is affixed to said bottom surface of said first substrate, one of said first and second portions of said resiliently compressible circuit member extending away from said first substrate and defining thereon an electrical connection structure.

12. The assembly of claim 11 wherein said second portion of said resiliently compressible circuit member defines a second opening therethrough to said bottom surface of said first substrate, said second opening aligned with said first opening defined through said first portion of said resiliently compressible circuit member;
and wherein the assembly further includes a lens housing mounted to said bottom surface of said first substrate through said second opening, said lens housing carrying at least one optical or compound lens configured to focus light through said first substrate to said imaging circuit.

13. The assembly of claim 12 further including a number of additional circuit components mounted to said resiliently compressible circuit member;
wherein said imaging circuit, said number of additional circuit components and said electrical connection structure are all electrically interconnected to form the optical image processing circuit.

14. The assembly of claim 1 wherein said first substrate defines a top surface and an opposite bottom surface;
and wherein a first portion of said resiliently compressible circuit member defining said first opening therethrough is affixed to said top surface of said first substrate.

15. The assembly of claim 14 further including a lens housing mounted to said bottom surface of said first substrate and aligned with said first opening, said lens housing carrying at least one optical or compound lens configured to focus light through said first substrate to said imaging circuit.

16. The assembly of claim 15 wherein said resiliently compressible circuit member is flexible;
and further including a second substrate having a second portion of said resiliently compressible circuit member affixed thereto, one of said first and second portions of said resiliently compressible circuit member extending away from a corresponding one of said first and second substrates and defining thereon an electrical connection structure.

17. The assembly of claim 16 wherein said second portion of said resiliently compressible circuit member includes a first number of additional circuit components mounted thereto;
wherein said imaging circuit, said first number of additional circuit components and said electrical connection structure are all electrically interconnected to form the optical image processing circuit.

18. The assembly of claim 17 further including a third substrate having a third portion of said resiliently compressible circuit member affixed thereto;
and wherein said third portion of said resiliently compressible circuit member includes a second number of additional circuit components mounted thereto;
wherein said imaging circuit, said first and second number of additional circuit components and said electrical connection structure are all electrically interconnected to form the optical image processing circuit.

19. The assembly of claim 18 wherein said first, second and third substrates are affixed to a camera housing.

20. The circuit assembly of claim 1, wherein the optically transmissive first substrate comprises a rigid substrate.

21. An optical information processing circuit assembly, the assembly comprising:
an optically transmissive first substrate;
a resiliently compressible circuit member affixed to said first substrate and defining a first opening therethrough with a number of electrically conductive leads disposed about said first opening; and
circuitry comprising a surface defining a number of electrically conductive pads disposed about an electrooptical device, each of said number of electrically conductive pads electrically contacting corresponding ones of said number of electrically conductive leads with said surface of said circuitry facing said first substrate through said first opening defined through said resiliently compressible circuit member.

22. The circuit assembly of claim 21, wherein the optically transmissive first substrate comprises a rigid substrate.

23. The circuit assembly of claim 21, wherein the electrooptical device comprises an imaging circuit.

* * * * *